(12) United States Patent
Nguyen Phuoc

(10) Patent No.: US 7,271,566 B2
(45) Date of Patent: Sep. 18, 2007

(54) METHOD AND SYSTEM FOR MANAGING THE VOLTAGE ON THE DC BUS OF A SPEED CONTROLLER FOR AN AC MOTOR

(75) Inventor: Vinh Tung Nguyen Phuoc, Boulogne Billancourt (FR)

(73) Assignee: Schneider Toshiba Inverter Europe SAS, Pacy sur Eure (FR)

(*) Notice: Subject to any disclaimer, the term of this patent is extended or adjusted under 35 U.S.C. 154(b) by 0 days.

(21) Appl. No.: 11/339,471

(22) Filed: Jan. 26, 2006

(65) Prior Publication Data
US 2006/0181240 A1  Aug. 17, 2006

(30) Foreign Application Priority Data
Jan. 27, 2005  (FR) .................................... 05 50239

(51) Int. Cl.
*H02P 5/34* (2006.01)
*H02P 27/04* (2006.01)

(52) U.S. Cl. .................. 318/807; 318/801; 318/798; 318/817; 318/609

(58) Field of Classification Search ............... 318/138, 318/245, 254, 434, 439, 807, 472, 817, 751, 318/801, 805, 798, 609, 610
See application file for complete search history.

(56) References Cited

U.S. PATENT DOCUMENTS

| | | | | |
|---|---|---|---|---|
| 4,116,306 A | * | 9/1978 | Alley | .......................... 187/293 |
| 4,553,187 A | * | 11/1985 | Burns et al. | .................. 361/96 |
| 4,804,892 A | * | 2/1989 | Muller | ........................ 318/254 |
| 4,972,134 A | * | 11/1990 | Getz et al. | .................. 318/817 |
| 5,260,645 A | * | 11/1993 | Williams et al. | ............ 323/299 |
| 5,276,392 A | * | 1/1994 | Beckerman | .................. 318/751 |
| 5,329,223 A | * | 7/1994 | Riggio | ........................ 323/246 |
| 5,444,359 A | * | 8/1995 | Riggio | ........................ 323/237 |
| 5,583,412 A | | 12/1996 | Nielsen | |
| 6,229,278 B1 | * | 5/2001 | Garces et al. | ................ 318/801 |
| 6,319,301 B1 | * | 11/2001 | Bueno et al. | .................. 75/384 |
| 6,429,612 B1 | | 8/2002 | Kume et al. | |
| 6,577,483 B1 | | 6/2003 | Steicher et al. | |
| 6,864,654 B1 | * | 3/2005 | Letor et al. | ................. 318/434 |
| 7,092,197 B2 | * | 8/2006 | El-Sherif et al. | ............. 360/75 |

FOREIGN PATENT DOCUMENTS

| | | |
|---|---|---|
| EP | 0 549 004 A1 | 6/1993 |
| JP | 56066189 | 6/1981 |

* cited by examiner

*Primary Examiner*—Paul Ip
(74) *Attorney, Agent, or Firm*—Oblon, Spivak, McClelland, Maier & Neustadt, P.C.

(57) ABSTRACT

A method and system for managing the voltage of a DC bus of a speed controller for an AC electric motor linked to a current distribution network. The method includes comparing a value of the voltage measured on the DC bus with a determined limit value, when the value of the voltage measured on the DC bus becomes greater than the limit value, forcing the slope of an internal ramp to a zero value so as to confer a constant frequency on the stator, and when the value of the voltage measured on the DC bus again becomes less than the limit value, progressively increasing the value of the slope of the internal ramp.

13 Claims, 2 Drawing Sheets

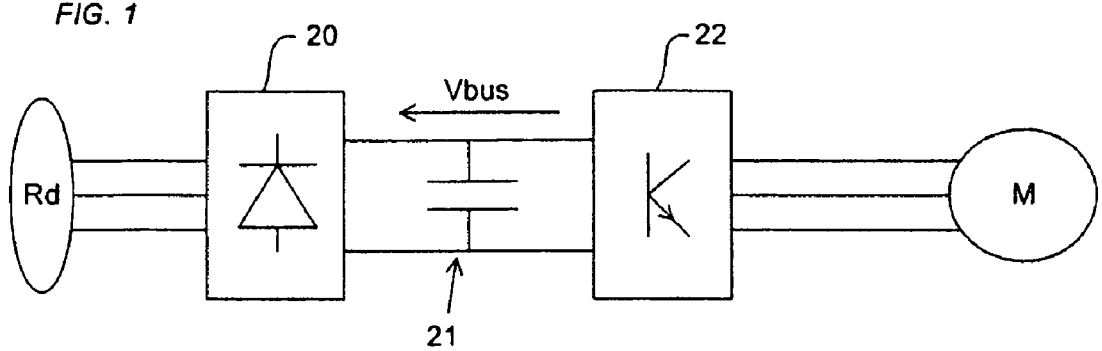
FIG. 1
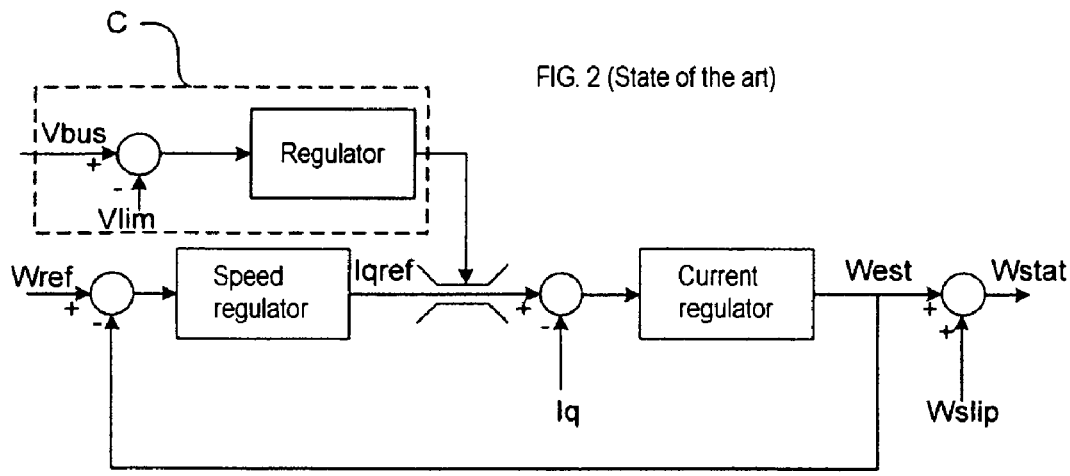
FIG. 2 (State of the art)
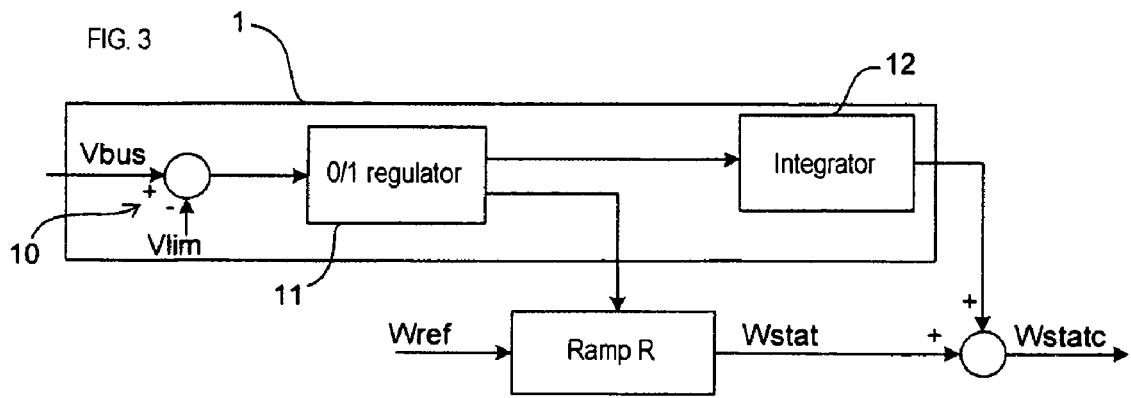
FIG. 3

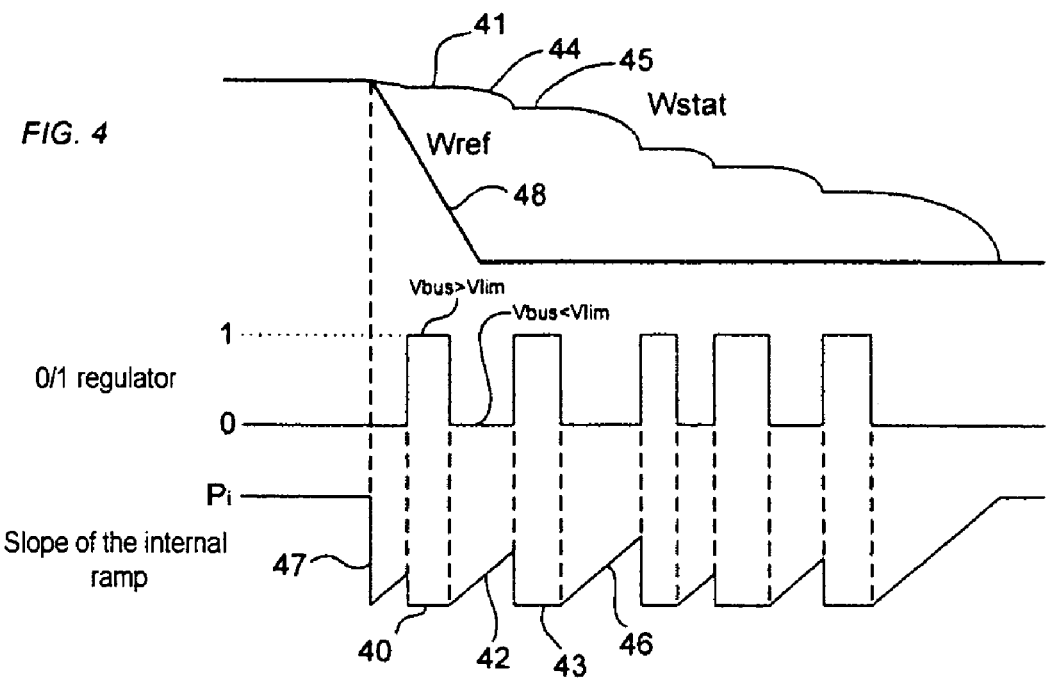
FIG. 4
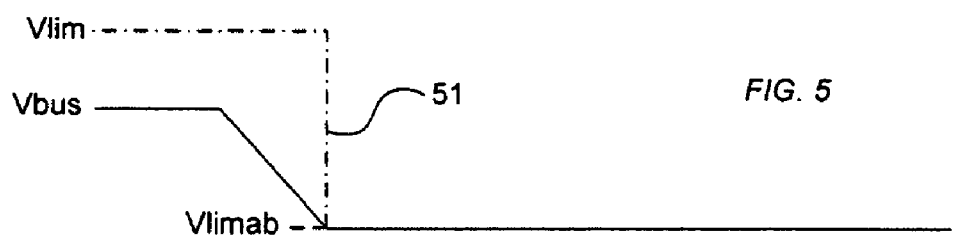
FIG. 5
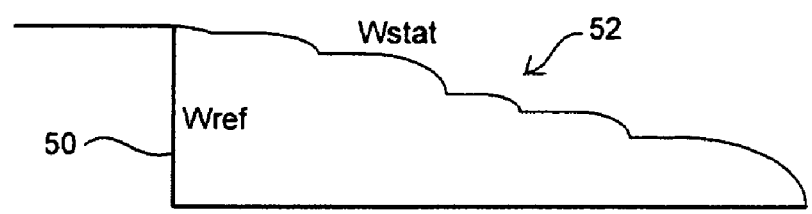

METHOD AND SYSTEM FOR MANAGING THE VOLTAGE ON THE DC BUS OF A SPEED CONTROLLER FOR AN AC MOTOR

BACKGROUND OF THE INVENTION

1. Field of the Invention

The present invention pertains to a method and a system for managing the voltage on the DC bus of a speed controller for an AC electric motor linked to a current distribution network, the said controller operating according to a voltage control law of U/F type.

2. Description of the Prior Art

In a known manner, a conventional speed controller for an electric motor comprises a DC bus linking the electric motor to the electrical current distribution network. This DC bus carries in particular a rectifier bridge with diodes, a filter with capacitor and an inverter bridge with transistors and diodes.

During normal operation, the electrical energy is transferred from the current distribution network to the electric motor. However, in certain situations, the energy of the motor may be regenerated to the capacitor of the DC bus. These situations are the following:

excessive and overly rapid braking of the motor (deceleration time overly short or braking torque overly high),
 at constant speed of the motor, driving of the motor by the load,
 outage of the current distribution network.

In these particular situations, the capacitor of the DC bus may be subject to overvoltages apt to damage it.

In the state of the art, these various situations are managed in the following manner:

With reference to FIG. 2, in a conventional speed controller operating according to a control law of vector type there are generally a speed loop and a current loop. A reference frequency Wref is imposed as input and is compared with an estimated frequency West obtained as output. The difference between the two frequencies is amplified by a speed regulator providing as output a current reference Iqref. The difference between the current reference Iqref and the value of the current Iq measured on the motor is amplified by a current regulator to provide the estimated frequency West. The control frequency Wstat dispatched to the stator of the motor is the sum of the estimated frequency West and of the slip compensation Wslip.

In the situations described above, in order to protect the capacitor from overvoltages, a voltage regulating circuit C is used. This voltage regulating circuit C compares first of all the value of the voltage Vbus measured on the DC bus with a determined limit value Vlim. This limit value corresponds to the value above which the capacitor of the DC bus experiences overvoltages apt to damage it.

In case of excessive braking of the motor, the output of the voltage regulating circuit C decreases the current reference Iqref in such a way as to reduce the current returned by the motor to the DC bus and to contrive matters in such a way that the voltage Vbus measured on the DC bus to return to a value below the limit value Vlim.

When the motor is driven by the load at constant speed, the voltage regulating circuit C increases the current reference Iqref in such a way as to increase the estimated frequency West and the speed of the motor and thus limit the voltage on the DC bus.

In case of outage of current on the distribution network, the limit value Vlim is lowered and the voltage regulating circuit C then imposes a current reference Iqref suitable for making the motor decelerate slowly while optimizing the consumption of the available current.

In a speed controller operating according to a nonvector voltage control law of U/F type as presented hereinabove, no current loop or speed loop is tolerated. Such a speed controller is admittedly less effectual but proves to be much more robust and may in particular be used in products such as transformers or fans.

In case of excessive braking of the motor, it is known through patent application JP 56066189 to manage the voltage on the DC bus of a speed controller to protect the capacitor of the DC bus. A comparator is charged with comparing the value of the voltage measured at the terminals of the capacitor with a limit value. When the value of the voltage measured at the terminals of the capacitor is greater than a limit value, the output signal of the comparator instructs the interruption of deceleration. The frequency of the stator is therefore maintained at a constant value. When the value of the voltage tapped across the terminals of the capacitor again becomes less than the limit value, the comparator no longer acts on the frequency and the latter may again decrease according to a ramp having a slope of determined value. Such a device makes it possible to limit the overvoltages experienced by the capacitor of the DC bus during excessive braking. However, after the action of the comparator on the ramp, the resumption of deceleration takes place directly following the nominal slope of the deceleration ramp. The deceleration of the motor therefore occurs with successive jerks that are apt to eventually degrade the operation of the motor.

SUMMARY OF THE INVENTION

The aim of the invention is to propose a method of managing the voltage on the DC bus of a speed controller for an AC electric motor, operating according to a voltage control law of U/F type and in which, in case of excessive braking, the deceleration of the motor occurs without jerks while safeguarding the capacitor of the DC bus from the overvoltages caused by the excessive braking.

This aim is achieved by a method for managing the voltage on the DC bus of a speed controller for an AC electric motor linked to a current distribution network, the said controller comprising on its DC bus electronic circuits and operating according to a voltage control law of U/F type in which an internal ramp of acceleration/deceleration of the motor, having an initial slope of determined value, is inserted between a reference frequency imposed as input of the control law of the said speed controller and a frequency of the stator obtained as output of this law. The said method is characterized in that it consists in:

comparing a value of the voltage measured on the DC bus with a determined limit value,
 when the value of the voltage measured on the DC bus becomes greater than the limit value, forcing the slope of the internal ramp to a zero value so as to confer a constant frequency on the stator,
 when the value of the voltage measured on the DC bus again becomes less than the limit value, progressively increasing the value of the slope of the internal ramp, for example in accordance with a determined time constant.

According to the invention, such a method makes it possible to limit the slowing of the motor and hence avoid overvoltages on the DC bus.

According to one feature, the progressive increase in the slope of the internal ramp is effected between its zero value and its initial value. During the progressive increase in the slope of the internal ramp, and before the latter has reached its initial value, the voltage measured on the bus may again become greater than the limit voltage. In this case, the slope of the internal ramp must again be reset to a value equal to zero to confer a constant speed on the motor and wait for a new dip in the voltage measured on the DC bus.

According to another feature, right from the instant at which a dip in the reference frequency is detected, the value of the slope of the internal ramp is set to zero. In this case this involves possibly anticipating excessive braking of the motor.

According to another feature, when the reference frequency is constant and when the value of the voltage measured on the DC bus is greater than or equal to the limit value, the method also consists in calculating with the aid of an integrator a correction value for the frequency of the stator and in adding this calculated value to the frequency of the stator. Such a characteristic makes it possible in particular to manage the overvoltages when the motor is driven by the load.

According to another feature, when the voltage measured on the DC bus has a value less than the limit value, the output of the integrator is set to zero so as to apply no correction to the frequency of the stator.

According to another feature, when an outage of the current distribution network is detected, it also consists in lowering the limit value to a minimum value defined as the voltage value sufficient to power the electronic circuits of the DC bus. During an outage of the distribution network, the reference frequency decreases greatly. In this case, the issue is not only that of limiting the deceleration of the motor but also that of maintaining the motor operational for as long as possible, hoping for swift restoral of the distribution network. Accordingly, the consumption of the remaining current is optimized.

The aim of the invention is also to propose a system for managing the voltage on the DC bus of a speed controller for an AC electric motor able to implement the method described hereinabove and to manage the various situations described hereinabove.

This system is characterized in that it comprises in particular:
- a voltage regulating circuit comprising means for comparing the value of a voltage measured on the DC bus with a limit value and, when the value of the voltage measured on the DC bus is greater than a limit value, means for forcing the slope of the internal ramp to a zero value so as to maintain the frequency of the stator at a constant value, and
- when the value of the voltage measured on the DC bus becomes less than the limit value, means of control for instructing a progressive increase in the value of the slope of the internal ramp, for example in accordance with a determined time constant.

According to the invention, the regulating circuit comprises for example a comparator for comparing the value of the voltage measured on the DC bus with the limit value and a regulator for controlling the setting to zero of the internal ramp.

According to one feature, this system also comprises means for setting the slope of the internal ramp to a zero value right from the instant at which a deceleration of the frequency of the stator is instructed.

According to another feature, the voltage regulating circuit also comprises an integrator able to calculate a correction frequency to be imposed on the frequency of the stator when the reference frequency is constant and when the voltage measured on the DC bus has a value greater than or equal to the limit value.

According to another feature, the integrator comprises means for limiting its output to a value equal to zero when the voltage measured on the DC bus has a value less than the limit value.

According to another feature, the system comprises means for detecting an outage of the current distribution network and for, in this situation, lowering the limit value to a minimum value defined as the voltage value sufficient to power the electronic circuits of the DC bus of the speed controller.

The issue, according to the invention is therefore that of proposing a complete system for managing the voltage on the DC bus of a speed controller making it possible to cope with various situations apt to cause overvoltages on the DC bus and hence to damage the capacitor present on this bus.

BRIEF DESCRIPTION OF THE DRAWINGS

Other characteristics and advantages will appear in the detailed description which follows while referring to an embodiment given by way of example and represented by the appended drawings in which:

FIG. 1 represents diagrammatically and in part a speed controller linked to an AC electric motor.

FIG. 2 represents, by way of a functional diagram, the manner of operation according to the prior art of a conventional speed controller able to manage the overvoltages on the DC bus of the speed controller.

FIG. 3 represents, by way of a functional chart, the manner of operation according to the invention of a speed controller operating according to a control law of U/F type able to manage the overvoltages on the DC bus of the speed controller.

FIG. 4 represents charts illustrating, during excessive braking of the motor, the manner of operation of a speed controller using the system for managing the voltage according to the invention.

FIG. 5 represents charts illustrating, during an outage of the current distribution network, the manner of operation of a speed controller using the system for managing the voltage according to the invention.

FIG. 2 relates to the prior art and has already been described previously.

DESCRIPTION OF THE PREFERRED EMBODIMENTS

With reference to FIG. 1, a speed controller for an AC electric motor comprises on a DC bus linking a current distribution network Rd to the motor M, electronic circuits, in particular a rectifier bridge with diodes 20, a filter with capacitor 21 and an inverter bridge with transistors and diodes 22. The inverter 22 is for example a customary voltage inverter controlled by Pulse Width Modulation referred to as a PWM inverter. Such a PWM inverter delivers to the motor M a string of pulses of fixed, positive or negative, amplitude, modulated in width, according to a voltage control law. The electronic switches of the inverter are commanded by a drive circuit comprising in particular a microcontroller.

In a speed controller operating according to a voltage control law of U/F type, no current loop is used. Thus, according to this control law, the reference frequency Wref imposed as input to a speed controller is always equal to the control frequency of the stator Wstat at the output of the speed controller.

As explained previously, in certain situations, the energy normally transferred from the current distribution network Rd to the motor M via the electronic circuits carried by the DC bus of the speed controller, may be regenerated to the capacitor 21 of the DC bus. Such is the case in particular during excessive braking of the motor M, when the motor M is driven by the load or during an outage of the current distribution network Rd.

In order to protect the capacitor 21 from overvoltages, it is therefore necessary to provide a method of managing a voltage of the DC bus of the speed controller implemented in an appropriate system.

With reference to FIG. 3, in the system for managing the voltage of the DC bus according to the invention, an internal ramp R of acceleration/deceleration of the motor is introduced into the voltage control law of U/F type. This internal ramp R exhibits a slope of determined initial value (Pi) according to which, during deceleration, the stator frequency Wstat obtained as output follows the reference frequency Wref imposed as input. During normal operation, this ramp is fast enough for no delay to be observable between a speed preset and a corresponding reaction of the motor M.

Measurement means are permanently charged with measuring the voltage on the DC bus. The value of this voltage Vbus measured is thereafter processed by a voltage regulating circuit 1 comprising a comparator 10 and a regulator 11. This comparator 10 compares the value of the voltage Vbus measured on the DC bus of the controller with a limit value Vlim stored in memory.

When the voltage Vbus is below the limit value Vlim, the output of the comparator 10 is negative, the regulator 11 is therefore not activated and provides a negative output having no effect on the internal ramp R.

During excessive braking of the motor M (deceleration time overly short or braking torque overly high), the reference frequency Wref decreases greatly (48, FIG. 4) and the voltage Vbus measured on the DC bus increases greatly until it exceeds the limit value Vlim. In such a situation, the output of the comparator 10 is positive, thereby bringing about the activation of the regulator 11. The regulator 11 thus provides a positive output and thus will act on the internal ramp R by allocating a value equal to zero to its slope (40, FIG. 4). Thus, with a deceleration ramp exhibiting a slope of zero value, the frequency of the stator Wstat ceases to decrease (41, FIG. 4) and the motor M operates henceforth at constant speed. While the voltage Vbus measured on the DC bus of the speed controller is greater than the limit value Vlim, the positive output of the regulator 11 pegs the, value of the slope of the internal ramp R at zero (40). By maintaining the motor M at a constant speed for a certain time, the energy which has been regenerated on the DC bus decreases progressively. When the value of the voltage Vbus measured on the DC bus again becomes less than the limit value Vlim, the output of the comparator 10 again becomes negative, this having the consequence of deactivating the regulator 11. The regulator 11 thus generates a negative output which frees the internal ramp R. The internal ramp R can thus resume its initial slope (Pi) to continue the deceleration. According to the invention, after it has been maintained at zero, the slope of the internal ramp R does not instantaneously resume its initial value Pi but follows a progressive increase according to a determined time constant (42). The increase in the value of the slope of the internal ramp R therefore follows a constant and linear progression between its zero value and its initial value Pi. Means of control of the speed controller are able to control this progressive increase in the value of the slope of the internal ramp R when the latter is freed. Thus, the deceleration of the motor resumes gently and without jerks (44). The progressive increase in the slope of the internal ramp R may occur until the slope regains its initial value Pi. Nevertheless, if it turns out that, during the progressive increase in the value of the slope, the value of the voltage Vbus measured on the DC bus again becomes greater than the limit value Vlim, the positive output of the comparator 10 activates the regulator 11 again. As previously, the positive output of the regulator 11 will then again act on the internal ramp R, zeroing the value of its slope (43). The frequency of the stator Wstat is thus again maintained at a constant value (45). The freeing of the internal ramp R will occur when the voltage Vbus measured on the DC bus is again less than the limit value Vlim. The slope of the internal ramp R will thus again follow a progressive increase (46) from its zero value up to, at maximum, its initial value Pi.

During excessive braking of the motor M, the various steps described hereinabove may occur successively so as to make the motor M follow a slow deceleration, according to the most linear curve possible (FIG. 4).

During an outage of the current distribution network Rd, the reference frequency Wref also decreases very greatly and becomes zero very rapidly (50, FIG. 5). This situation is therefore akin to excessive braking of the motor and may, as in the previous situation, occasion overvoltages on the capacitor of the DC bus of the speed controller. However, in this situation, given that the network Rd can no longer supply any current, the deceleration of the motor M needs to be supervised in order to maintain the motor M operational for as long as possible with a view to a possible restoring of the distribution network Rd. To avoid the complete and rapid stoppage of the motor M, it is necessary to manage the voltage Vbus on the DC bus by maintaining it at a value sufficient to power the electronic circuits carried by the DC bus. When an outage of the current distribution network Rd is detected, the limit value Vlim is therefore reduced to a lower value (51, Vlimab) corresponding to the minimum voltage value for powering the electronic circuits present on the DC bus. Once the limit value Vlim has been reduced, the method of managing the voltage Vbus on the DC bus implemented in the case of excessive braking of the motor M and described hereinabove may be conducted in the same manner. According to this method, we witness a reduction (52) in the frequency of the stator Wstat and therefore a slow and progressive deceleration of the motor M. By limiting the voltage Vbus measured on the DC bus to a value substantially equal to the reduced limit value Vlimab, we optimize the consumption of the current still available to maintain the motor M operational for as long as possible with a view to the current distribution network Rd hopefully being restored.

According to the invention, to increase the effectiveness of the protection of the capacitor, right from the start of a deceleration, hence right from the detection of a dip in the reference frequency Wref, the slope of the internal ramp R can be routinely set to a value equal to zero (47) even if the voltage Vbus measured on the DC bus has not yet increased.

The system according to the invention also makes it possible to manage the overvoltages on the DC bus when the motor M is driven by the load. In the voltage regulating circuit 1 of the system according to the invention, an integrator 12 (FIG. 3) disposed at the output of the regulator 11 is used. The regulator 11 therefore affords, through the integrator 12, a correction to the frequency of the stator Wstat. This integrator 12 makes it possible to calculate a correction value to be applied directly to the frequency of the stator Wstat in order to obtain a corrected frequency of the stator Wstatc.

When the motor M is driven by the load, the reference frequency Wref is constant and the internal ramp R is not active since no deceleration has been instructed. Nevertheless, in this situation, the voltage Vbus measured on the DC bus can take a value greater than the limit value Vlim. When the voltage Vbus measured on the DC bus is greater than the limit value Vlim, the positive output of the comparator 10 activates the regulator 11. The positive output of the regulator 11 also activates the integrator 12 situated downstream which thus calculates a correction value. This correction value corresponds to the gain in frequency to be applied to the frequency of the stator so that the voltage Vbus measured on the DC bus falls to a value below or equal to the limit value Vlim. This gain in frequency is therefore calculated by the integrator 12 on the basis of the difference between the voltage Vbus measured on the DC bus and the limit value Vlim.

When the voltage Vbus measured on the DC bus is at a value below the limit value, the output of the regulator 11 is negative and the output of the integrator 12 is limited to zero in such a way as, in this case, not to apply any correction to the frequency of the stator Wstat. On the other hand, when the voltage (Vbus) measured on the bus is equal to the limit value Vlim, the integrator 12 has the property of providing a non-zero output even when the input is zero. Thus, this makes it possible to apply a correction to the frequency of the stator Wstat even when the voltage Vbus measured on the bus is equal to the limit value Vlim.

It is of course understood that, without departing from the scope of the invention, it is possible to contemplate other variants and refinements of detail and likewise to envisage the use of equivalent means.

The invention claimed is:

1. A method for managing a voltage on a DC bus of a speed controller for an AC electric motor linked to a current distribution network, the controller comprising on its DC bus electronic circuits and operating according to a voltage control law of U/F type in which an internal ramp of acceleration/deceleration of the motor, having an initial slope of determined value, is inserted between a reference frequency imposed as input of the control law of the speed controller and a frequency of the stator obtained as output of this law, the method comprising:
    comparing a value of the voltage measured on the DC bus with a determined limit value;
    when the value of the voltage measured on the DC bus becomes greater than the limit value, forcing the slope of the internal ramp to a zero value so as to confer a constant frequency on the stator; and
    when the value of the voltage measured on the DC bus again becomes less than the limit value, progressively increasing the value of the slope of the internal ramp.

2. The method of claim 1, wherein the progressive increase in the value of the slope of the internal ramp occurs in accordance with a determined time constant.

3. The method of claim 1, wherein the progressive increase in the slope of the internal ramp is effected between its zero value and its initial value.

4. The method of claim 1, wherein, right from the instant at which a dip in the reference frequency is detected, the value of the slope of the internal ramp is set to zero.

5. The method of claim 1, wherein, when the reference frequency is constant and when the value of the voltage measured on the DC bus is greater than or equal to the limit value, it also consists in calculating with the aid of an integrator a correction value for the frequency of the stator and in adding this calculated value to the frequency of the stator.

6. The method of claim 5, wherein when the voltage measured on the DC bus has a value less than the limit value, the output of the integrator is set to zero so as to apply no correction to the frequency of the stator.

7. The method of claim 1, wherein when an outage of the current distribution network is detected, it also consists in lowering the limit value to a minimum value defined as the voltage value sufficient to power the electronic circuits of the DC bus.

8. A system for managing a voltage on a DC bus of a speed controller for an AC electric motor linked to a current distribution network, the controller comprising on its DC bus electronic circuits and operating according to a voltage control law of U/F type in which an internal ramp of acceleration/deceleration of the motor, having an initial slope of determined value, is inserted between a reference frequency defined as input of the said control law and the frequency imposed on the stator as output of the said control law, the system comprising:
    a voltage regulating circuit comprising means for comparing the value of a voltage measured on the DC bus with a limit value and, when the value of the voltage measured on the DC bus is greater than a limit value, means for forcing the slope of the internal ramp to a zero value so as to maintain the frequency of the stator at a constant value, and
    when the value of the voltage measured on the DC bus becomes less than the limit value, means of control for instructing a progressive increase in the value of the slope of the internal ramp.

9. The system of claim 8, wherein the means of control comprise a determined time constant in accordance with which the progressive increase in the value of the slope of the internal ramp occurs.

10. The system of claim 8, further comprising means for setting the slope of the internal ramp to a zero value right from the instant at which a deceleration of the frequency of the stator is instructed.

11. The system of claim 8, wherein the voltage regulating circuit also comprises an integrator configured to calculate a correction frequency to be imposed on the frequency of the stator when the reference frequency is constant and when the voltage measured on the DC bus has a value greater than or equal to the limit value.

12. The system of claim 11, wherein the integrator comprises means for limiting its output to a value equal to zero when the voltage measured on the DC bus has a value less than the limit value.

13. The system of claim 8, further comprising:
    means for detecting an outage of the current distribution network and for, in this situation, lowering the limit value to a minimum value defined as the voltage value sufficient to power the electronic circuits of the DC bus of the speed controller.

* * * * *